J. HANRAHAN.
Rock-Drills.

No. 158,704.

Patented Jan. 12, 1875.

Witnesses
John Grist, Senr.
John S. Grist

Joseph Hanrahan
Inventor
By Henry Grist
Attorney.

UNITED STATES PATENT OFFICE.

JOSEPH HANRAHAN, OF OTTAWA, CANADA.

IMPROVEMENT IN ROCK-DRILLS.

Specification forming part of Letters Patent No. 158,704, dated January 12, 1875; application filed December 18, 1874.

*To all whom it may concern:*

Be it known that I, JOSEPH HANRAHAN, of the city of Ottawa, in the county of Carleton, in the Province of Ontario, Canada, have invented certain new and useful Improvements in Rock-Drills; and I do hereby declare that the following is a full, clear, and exact description of the same.

The object of this invention is to cause the drill to perform a slight rotary motion by impingement with the rock, thus dispensing with the employment of mechanical means for such purpose when used with a drilling-machine; and it consists in beveling one or both wings of a drill having a cruciform head or bit on opposite sides unequally, whereby the cutting-edges do not intersect centrally, the unequal beveling of the sides throwing the wing-edges out of a radial line with each other, and the incline of the greater bevel causes the drill to rotate in that direction. The through cutting-edge may be recessed centrally to cause the drill to form a raised center in the rock, about which it turns axially, and helps to direct the drill in a straight course.

Figure 1:
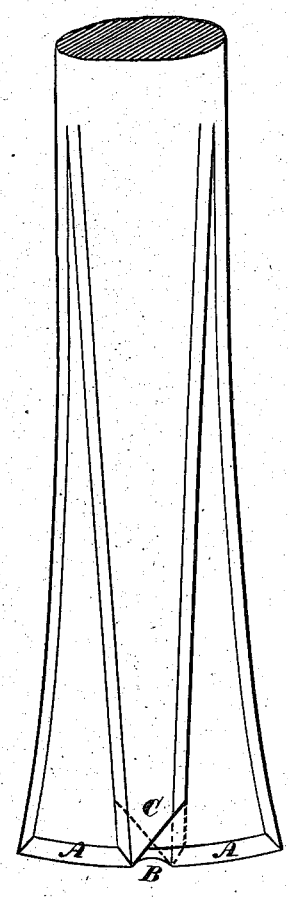
Figure 2:
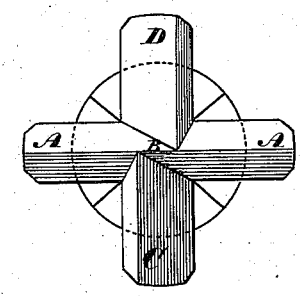

Figure 1 is an elevation of a drill embodying my invention. Fig. 2 is an end view of the same.

The drill-head is of cruciform shape. A I designate as the "through" cutting-edge, and those at right angles thereto the wings C and D. It will be observed that the cutting-edges of the wings C and D are parallel, and are not in radial line with each other. This results from the bevel or "set-off" being greater on one side of the wing than on the opposite side. The object in beveling the wings C and D in this manner is to cause the greater or broader inclines to act uniformly in one direction, whereby the drill, by impingement with the rock, turns around its axis of motion, and thereby at each successive impingement to cut upon a new surface. It will, therefore, be evident that the drill can be made to perform a revolution toward the right or left by having the greater or broader inclines of the bevels in the direction the drill is required to turn.

In the construction of my improved drill, I prefer to recess the cutting-edge A centrally, or between the intersecting wings C and D, the object being to cause the drill by such recess to form a central raised point in the bore, about which the drill will axially turn and direct the drill in a straight course.

I claim as my invention—

1. A rock-drill having a cruciform bit, and either or both of the radial wings C and D beveled unequally on opposite sides, as shown, to throw the two cutting-edges out of a radial line, substantially as set forth.

2. A rock-drill having either or both of its radial wings beveled unequally on opposite sides, and its through cutting-edge A recessed centrally, as and for the purpose set forth.

JOSEPH HANRAHAN.

Witnesses:
JOHN GRIST, Jr.,
HENRY GRIST.